US011810182B2

(12) United States Patent
Bassett

(10) Patent No.: US 11,810,182 B2
(45) Date of Patent: Nov. 7, 2023

(54) TECHNIQUES FOR COMPLETING PRE-ARRANGED TRANSACTIONS

(71) Applicant: NCR Corporation, Duluth, GA (US)

(72) Inventor: Daniel Bassett, Atlanta, GA (US)

(73) Assignee: NCR Corporation, Atlanta, GA (US)

(*) Notice: Subject to any disclaimer, the term of this patent is extended or adjusted under 35 U.S.C. 154(b) by 747 days.

(21) Appl. No.: 14/469,176

(22) Filed: Aug. 26, 2014

(65) Prior Publication Data

US 2016/0063616 A1    Mar. 3, 2016

(51) Int. Cl.
*G06Q 30/0645* (2023.01)
*G06Q 50/30* (2012.01)
*G06Q 20/32* (2012.01)
*G07F 17/00* (2006.01)
*G06Q 30/016* (2023.01)

(52) U.S. Cl.
CPC ........ *G06Q 30/0645* (2013.01); *G06Q 20/322* (2013.01); *G06Q 20/3224* (2013.01); *G06Q 20/3278* (2013.01); *G06Q 30/016* (2013.01); *G06Q 50/30* (2013.01); *G07F 17/0057* (2013.01)

(58) Field of Classification Search
CPC ............ G06Q 30/0645; G06Q 20/322; G06Q 20/3224; G06Q 20/3278; G06Q 30/016; G06Q 50/30; G06Q 10/02; G07F 17/0057
USPC .......................................................... 705/13
See application file for complete search history.

(56) References Cited

U.S. PATENT DOCUMENTS

| | | | |
|---|---|---|---|
| 8,768,565 B2 | 7/2014 | Jefferies et al. | |
| 2001/0037298 A1* | 11/2001 | Ehrman | G06Q 10/02 705/40 |
| 2002/0186144 A1* | 12/2002 | Meunier | G07B 15/00 340/4.6 |
| 2010/0082491 A1* | 4/2010 | Rosenblatt | G06Q 10/02 705/65 |
| 2012/0105197 A1* | 5/2012 | Kobres | G06Q 30/06 340/5.72 |
| 2014/0011478 A1 | 1/2014 | Collins et al. | |
| 2014/0018870 A1 | 1/2014 | Cooke et al. | |
| 2014/0114780 A1* | 4/2014 | Menefee | G06Q 20/20 705/21 |
| 2014/0278607 A1* | 9/2014 | Johnson | B60R 25/24 705/5 |

(Continued)

OTHER PUBLICATIONS

Lawler, R., "A First Look At Silvercar, The Future Of Airport Car Rentals," Published by techcrunch.com, Jan. 16, 2013, Retrieved from https://techcrunch.com/2013/01/16/silvercar-first-look/ (Year: 2013).*

(Continued)

*Primary Examiner* — Rupangini Singh
*Assistant Examiner* — Bryan J Kirk
(74) *Attorney, Agent, or Firm* — Schwegman Lundberg & Woessner, P.A.

(57) ABSTRACT

Techniques for completing pre-arranged transactions which improve customer service. An example method includes receiving a signal from a beacon by a mobile communication device, sending a first message containing an identifier by the mobile communication device, and receiving a second message containing information for completing the transaction by the mobile communication device.

13 Claims, 3 Drawing Sheets

(56) References Cited

U.S. PATENT DOCUMENTS

| | | | | |
|---|---|---|---|---|
| 2014/0278608 A1* | 9/2014 | Johnson | ................. | B60R 25/24 |
| | | | | 705/5 |
| 2014/0279713 A1* | 9/2014 | Calman | ............... | G06Q 20/127 |
| | | | | 705/418 |
| 2014/0358632 A1* | 12/2014 | Graff | ................. | G06Q 30/0224 |
| | | | | 705/7.29 |
| 2015/0018011 A1* | 1/2015 | Mendelson | ......... | G01C 21/206 |
| | | | | 455/456.3 |
| 2015/0227969 A1* | 8/2015 | Hanly | ............... | G06Q 30/0252 |
| | | | | 705/14.5 |
| 2015/0348179 A1* | 12/2015 | Kamisawa | ............ | G08G 1/205 |
| | | | | 705/5 |
| 2017/0039489 A1* | 2/2017 | Reh | ....................... | G06Q 10/02 |

OTHER PUBLICATIONS

European Search Report issued in co-pending European patent application EP15182232.7 dated Dec. 22, 2015.

\* cited by examiner

TECHNIQUES FOR COMPLETING PRE-ARRANGED TRANSACTIONS

BACKGROUND

This present invention relates to techniques for providing facilitating communication between customers and businesses at business locations, and more specifically to techniques for completing pre-arranged transactions.

Using the convenience of the Internet and the World Wide Web (Web), customers may initiate transactions remotely from business locations and then complete the transactions when they arrive at the business locations. For example, customers may reserve hotel rooms, rental cars, restaurant times, and seats at entertainment venues.

When customers arrive at and/or depart from business locations, they are often expected to take whatever steps are necessary to complete the transactions. However, the steps are not streamlined and customers may not be familiar with them.

Therefore, it would be desirable to provide techniques for completing pre-arranged transactions that are more efficient and provide improved customer service.

SUMMARY

In accordance with the teachings of the present invention, techniques for completing pre-arranged transactions are provided.

An example method includes receiving a signal from a beacon by a mobile communication device, sending a first message containing an identifier by the mobile communication device, and receiving a second message containing information for completing the transaction by the mobile communication device.

An example method of completing a pre-arranged vehicle rental transaction includes receiving signals from one or more beacons at a vehicle rental lot by a mobile communication device of a customer, sending a first message containing an identifier that distinguishes the customer from other customers at the vehicle rental lot to a vehicle rental transaction server by the mobile communication device, and receiving a second message containing sufficient information for the customer to proceed directly to a vehicle identified by the vehicle identification information.

The example method of completing the pre-arranged vehicle rental transaction may further include receiving additional signals from the one or more beacons after returning to the vehicle rental lot by the mobile communication device, sending a third message containing the identifier to the vehicle rental transaction server by the mobile communication device, and receiving a fourth message containing an indication that the vehicle rental transaction is complete by the mobile communication device.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
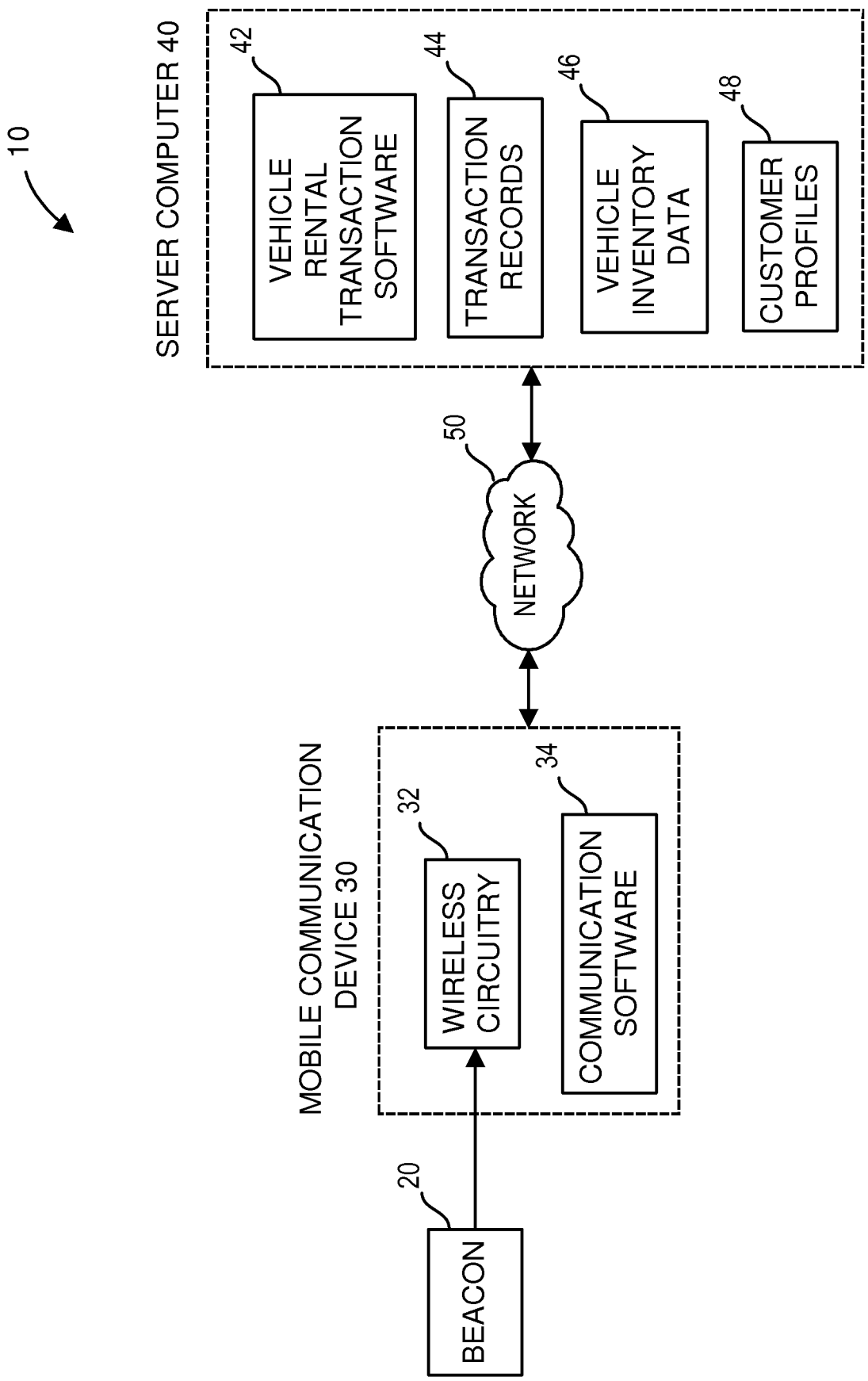
FIG. 1 is a block diagram of an example transaction system.

With reference to FIG. 1, an example transaction system 10 includes a beacon 20 at a business establishment for facilitating interaction and/or communication between the business and customers. More specifically beacon 10 facilitates communication between a mobile communication device 30 of a customer and a server 40.

Beacon 20 may include a Bluetooth Low Energy (BLE) standard beacon. Beacon 20 transmits a wireless signal, which may include a 2.4 GHz signal. Other types of wireless beacons are also envisioned. The signal may include information, such as an identifier associated with beacon 20 should the business wish to locate the customer and the business establishment has many beacons 20.

In some embodiments, one or more beacons 20 may be located at a business entrance. In other embodiments, beacons 20 may be located elsewhere in the business establishment, such as at product or service delivery points.

In one an example embodiment, the business establishment is a vehicle rental facility and transaction system is a vehicle rental transaction system.

To pre-stage a vehicle rental transaction, a customer completes a reservation for a vehicle. In one example, the customer connects via network 50 to server 40 using mobile communication device 30, a personal computer, a vehicle rental kiosk, or other computing device. For this purpose, server 40 may be a web server computer.

In another example, the customer makes the reservation over the phone and provides customer identification and payment information, loyalty or rewards card information, and/or reservation times to a rental car company, travel agent, or other representative. Other channels are also envisioned.

Server 40 executes vehicle rental software 42 which maintains transaction records 44 containing the details of vehicle rental transactions. For example, vehicle rental software 42 may record customer identification and payment information, loyalty or rewards card information, record reservation times from the customer, and process payment from the customer.

During the vehicle rental transaction, vehicle rental transaction software 42 may obtain and use customer information from a previously created customer profile 48. Customers may register with a rental car company to store their information in customer profiles 48. For example, customer profile 48 may contain driver's license information, credit card information, preferences for electronic receipts, preferences for messages and alerts to mobile communication device 30, e.g., phone number, email address, pick-up and drop-off preferences including preferences for interacting with beacon 20, and/or customer preferences for vehicles, including vehicle features and settings.

Vehicle rental software 42 receives a message from mobile communication device 30 indicative of the arrival of a customer carrying mobile communication device 30. In response to the message, vehicle rental transaction software 42 may identify an available vehicle from vehicle inventory data 46 and associate it with the customer by making an entry in the customer's transaction record 44. Vehicle rental software 42 may then send a message to mobile communication device 30 containing information about the vehicle including its location, e.g., parking spot number.

Server 40 includes one or more processors, memory, and program storage, and may execute an operating system such as a Microsoft or Linux operating system. The processor executes software which is stored in a computer readable medium, such as a memory. For example, server 40 may execute web server software and be connected to the World Wide Web (WWW or "web") and provide web content, including web pages, during pre-staging and otherwise.

The functions of server 40 may be provided by one or more computers "in the cloud". Server computer 14 may be located at the vehicle rental location or offsite.

Network 50 may include any combination of wireless or wired networks, including local area, wide area, virtual private, and global communication networks, such as the Internet.

Mobile communication device 30 may include a smart phone, personal digital assistant, or other portable communication device. Mobile communication device 30 may include one or more processors, memory, program storage, a display, an input device (which may be combined with the display as a touch screen, and cellular and network communication circuitry. Mobile communication device 30 may execute an operating system such as a Microsoft, Google, or Apple operating system. The processor executes software which is stored in a computer readable medium, such as a memory. For example, mobile communication device 30 may execute web browser software for connecting to web server software executed by server 40.

Mobile communication device 30 also includes wireless circuitry 32 and executes communication software 34.

Wireless circuitry 32 receives signals from beacon 20 when mobile communication device 30 is within communication range of beacon 20 and wireless circuitry 32. In an example embodiment in which beacon 20 includes BLE circuitry, wireless circuitry 32 is also BLE circuitry.

Communication software 34 determines whether wireless circuitry 32 is receiving signals from beacon 20. When wireless circuitry 32 is receiving signals from beacon 20, communication software 34 sends a message to server 40 containing a customer, transaction, or other identifier.

In one example embodiment, communication software 34 both detects beacon 20 and facilitates communication between mobile communication device 30 and service computer 40. Communication software 34 sends and receives messages from server 40.

In another example embodiment, communication software 34 may only detect beacon 20 and send an initial message to service 40. Further communication between mobile communication device 30 and server 40 may then be carried out using simple message service (text) message addressed to the phone number of mobile communication device 30 or using other communication features that are built-in to mobile communication device 30.

For example, vehicle rental transaction software 42 determines that the customer is picking up a vehicle, vehicle rental transaction software 42 may send information about a vehicle designated by vehicle rental transaction software 42 for the customer, including the vehicle's location, through communication software 34 or via an instant messaging application of mobile communication device.

If vehicle rental transaction software 42 determines that the customer is dropping off a vehicle, vehicle rental transaction software 42 may interact with communication software 34 to obtain mileage, fuel level, parking spot, and/or other information and provide an electronic receipt or through communication software 34 or via the instant messaging or other application.

In one example embodiment, the vehicle rental establishment provides or otherwise makes communication software 34 available to customers who wish to take advantage of the enhanced customer service it provides. For example, the vehicle rental establishment may provide communication software 34 and associated services to a preferred class of customers only, as opposed to other classes of customers.

The customer causes mobile communication device 30 smartphone to download communication software 34 as a native mobile application. The customer uses the mobile application to establish a connection between the mobile application and services offered by server 40 in the cloud.

Figure 2:
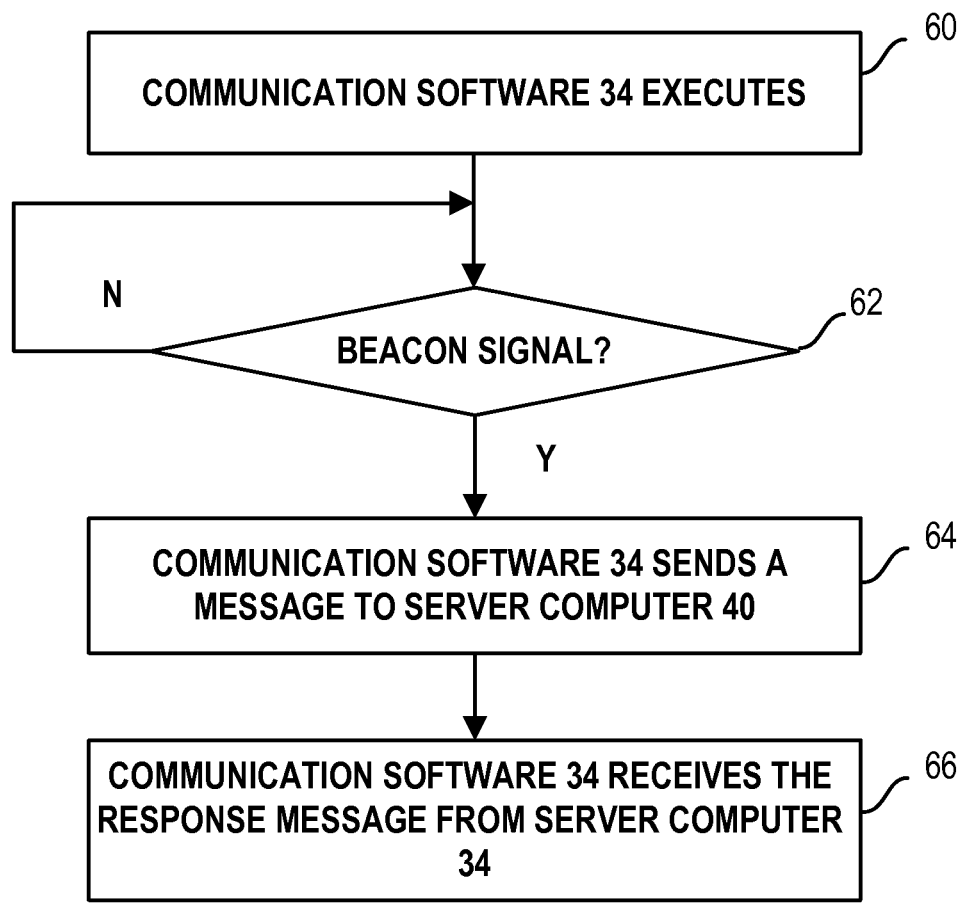
FIG. 2 illustrates an example vehicle rental pick-up method.

Referring now to FIG. 2, an example vehicle pick-up method is illustrated. A vehicle rental transaction customer may execute communication software 34 upon arrival at a vehicle rental lot to begin monitoring for a signal from beacon 20.

In step 60, communication software 34 executes.

In step 62, communication software 34 waits for a signal from beacon 20. If communication software 34 determines that wireless circuitry 32 has received a signal from beacon 20, operation proceeds to step 64.

In step 64, communication software 34 sends a message to server 40 through network 50 containing a customer, transaction, or other identifier that distinguishes the customer from other customers who might also be on the vehicle rental lot and using communication software 34.

Server 40 receives the message from mobile communication device 30. In response to the message, vehicle rental transaction software 42 accesses the customer's transaction record 44, determines that the customer is picking up a vehicle, and identifies an available vehicle from vehicle inventory data 46 and associates it with the customer by making an entry in the customer's transaction record 44. Vehicle rental software 42 then sends a message to mobile communication device 30 containing vehicle identification information, the vehicle's location and optionally other information.

For example, the message may contain information describing the vehicle. As another example, the message may contain instructions for departing the vehicle rental lot. As another example, the message may include points of interest. As yet another example, the message may include promotional offers.

In step 66, mobile communication device 30 receives the response message from server computer 34 through network 50.

Mobile communication device 30 may receive the information through communication software 34 or via a text, email, or other message from server 40.

The customer proceeds to the vehicle location and drives towards the vehicle rental lot exit.

Advantageously, the customer does not need to stop at an intermediate location, such as a vehicle rental office, a customer rental vehicle location board, or other location. After communication software 34 provides the rental vehicle location to the customer, the customer may proceed directly to the vehicle.

Figure 3:
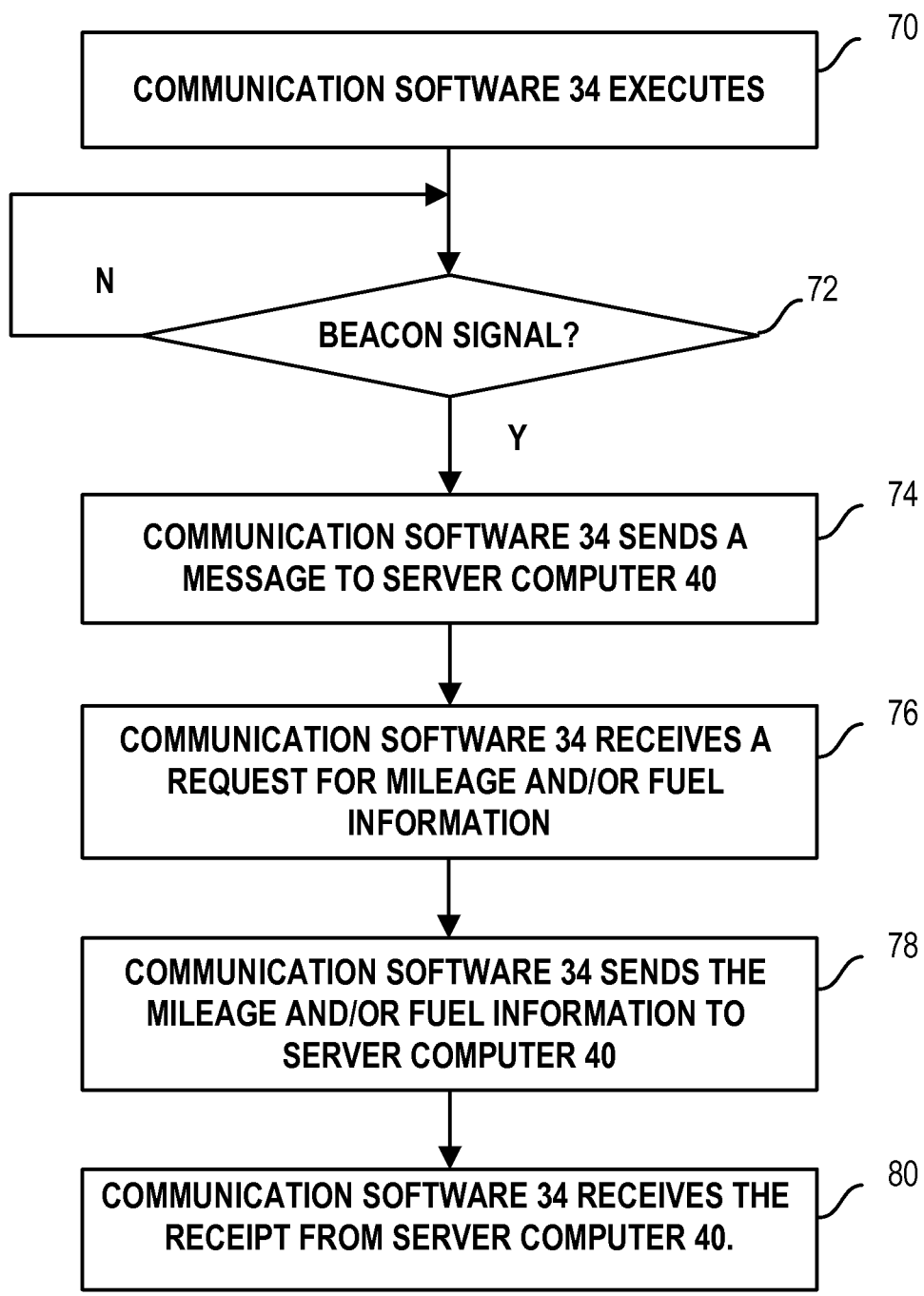
FIG. 3 illustrates an example vehicle rental drop-off method.

Referring now to FIG. 3, an example vehicle drop-off method is illustrated. Upon returning to a vehicle rental lot to return a vehicle, a vehicle rental transaction customer may proceed directly to a drop-off point and park the vehicle. The customer may execute communication software 34 using mobile communication device 30 to begin monitoring for a signal from beacon 20.

In step 70, communication software 34 executes.

In step 72, communication software 34 waits for a signal from beacon 20. If communication software 34 determines that wireless circuitry 32 has received a signal from beacon 20, operation proceeds to step 74.

In step 74, communication software 34 sends a message to server 40 through network 50 containing a customer, transaction, or other identifier that distinguishes the customer from other customers who might also be on the vehicle rental lot and using communication software 34.

Server 40 receives the message from mobile communication device 30. In response to the message, vehicle rental transaction software 42 accesses the customer's transaction record 44 and determines that the customer is returning a vehicle. Depending on the terms of the transaction, vehicle rental transaction software 42 may send a message to mobile communication device 30 prompting the customer to enter completion information, such as mileage, fuel level, parking spot, and/or other information, using communication software 34.

In step 76, mobile communication device 30 receives a request for mileage, fuel level, parking spot, and/or other information.

Communication software 34 may receive other requests, like survey requests. Communication software 34 may also receive promotional and/or other materials from server 40.

Mobile communication device 30 may receive the request and the promotional and/or other materials through communication software 34 or via a text, email, or other message from server 40.

The customer enters the mileage, fuel level, parking spot, and/or other information into communication software 34 or into another communication application, such as an instant messaging or email application.

In step 78, mobile communication device 30 sends the requested information to server 40.

Mobile communication device 30 may send this information through communication software 34 or via a text, email, or other message application to server 40.

Vehicle rental transaction software 42 makes an entry in the customer's transaction record 44, processes payment using payment information in the customer's transaction record 44 or the customer's profile 40, and sends the customer an indication of completion of the transaction, such as an electronic receipt, through an email address in the customer's transaction record 44 or the customer's profile 40.

In step 80, mobile communication device 30 receives the receipt from server 40.

Mobile communication device 30 may receive the receipt through communication software 34 or via a text, email, or other message from server 40.

The customer may then depart the rental car lot.

Advantageously, the customer does not need to stop at an intermediate location, such as a vehicle rental office or wait for vehicle rental lot employee to obtain mileage and fuel information and to provide a receipt. After communication software 34 provides the receipt, the customer may leave the vehicle rental lot.

Although the present invention has been described with particular reference to certain preferred embodiments thereof, variations and modifications of the present invention can be effected within the spirit and scope of the following claims.

What is claimed is:

1. A method of completing a pre-arranged transaction comprising:

completing, by mobile communication device software that executes on a processor of a mobile communication device, a reservation for a vehicle with a vehicle rental transaction system, wherein the vehicle rental transaction system records loyalty information for a customer, reservation times for the reservation, and the reservation in a transaction record and associates the transaction record with a customer profile of the customer, wherein the customer profile comprising payment information that the vehicle rental transaction system processes for payment of the reservation, preferences for electronic receipts, preferences for messages and alerts to the mobile communication device, pick-up and drop-off preferences including preferences for interacting with a beacon, and customer preferences for vehicle features and settings;

receiving, by the mobile communication device software a signal from the beacon at a transaction location identified in the transaction record, wherein receiving further includes just detecting, by the mobile communication device software, the signal from the beacon and a beacon identifier for the beacon included in the signal;

facilitating, by the mobile communication device software and a server of the vehicle rental transaction system, a network connection to one another based on receipt of the signal at the transaction location by the mobile communication device and using text-based messaging between the mobile communication device and the vehicle rental transaction system based on receipt of the signal;

sending, by the mobile communication device software, a first message containing the beacon identifier in response to receipt of the signal from the beacon at the transaction location over the network connection, wherein the beacon identifier associated with a known location for the beacon, wherein sending further includes sending, by the mobile communication device software, the first message to the vehicle rental transaction system associated with the transaction location, wherein the first message is indicative of the mobile communication device being at the transaction location based on the beacon identifier, and wherein the first message initiates a next phase of a pre-staged transaction associated with the reservation at the transaction location with the vehicle rental transaction system; and receiving, by the mobile communication device from the vehicle rental transaction system, a second message in response to the first message containing information for completing the next phase of the pre-staged transaction associated with the reservation at a car rental facility based on the transaction record and the customer profile, wherein receiving further includes receiving the second message on the mobile communication device as a text message, wherein the second text message includes a vehicle location at the car rental facility for the vehicle reserved by the pre-staged transaction and completing the pre-staged transaction by interaction between the beacon, the mobile communication device, and the vehicle rental transaction system when the mobile communication device is detected as being located at the transaction location using the text-based messaging; and processing the method without the customer stopping at a vehicle rental office or a vehicle rental location board at the car rental facility.

2. The method of claim 1, wherein the beacon is located at a transaction establishment where the transaction is to be completed.

3. A method of completing a pre-arranged vehicle rental transaction comprising:
completing, by mobile communication device software that executes on a processor of a mobile communication device, a reservation for a vehicle with a vehicle rental transaction system, wherein the vehicle rental transaction system records loyalty information for a customer, reservation times for the reservation, and the reservation in a transaction record and associates the transaction record with a customer profile of the customer, wherein the customer profile comprising payment information that the vehicle rental transaction system processes for payment of the reservation, preferences for electronic receipts, preferences for messages and alerts to the mobile communication device, pick-up and drop-off preferences including preferences for interacting with one or more beacons, and customer preferences for vehicle features and settings;
receiving, by the mobile communication software, signals from the one or more beacons at pre-determined locations of a vehicle rental lot when the customer who has the mobile communication device is at the vehicle rental lot, wherein receiving further includes just detecting the signals by the mobile communication software and identifying a beacon identifier from one of the signals provided by at least one beacon;
facilitating, by the mobile communication software and a vehicle rental transaction server of the vehicle rental transaction system, a network connection to one another based on receipt of the signals at the predetermined locations by the mobile communication device and using text-based messaging between the mobile communication device and the vehicle rental transaction system based on receipt of the signals;
sending, by the mobile communication software, a first message to the vehicle rental transaction system upon to receipt of at least one of the signals from the one or more beacons over the network connection, wherein the first message is indicative of the mobile communication device and the customer being at the vehicle rental lot and contains the beacon identifier and an identifier that distinguishes the customer from other customers at the vehicle rental lot based on the transaction record and the customer profile, and wherein the first message initiates a next phase of the vehicle rental transaction associated with the reservation;
receiving, by the mobile communication device, a second message from the vehicle rental transaction system in response to the first message as a text message and during the next phase of the vehicle rental transaction containing vehicle location information for the customer to proceed directly to the vehicle at a vehicle location based on the transaction record and the customer profile, and completing pickup of the vehicle based on interaction between the one or more beacons, the mobile communication device, and the vehicle rental transaction system when the mobile communication device is detected as being located at the vehicle rental lot using the text-based messaging; and
processing the method without the customer stopping at a vehicle rental office or a vehicle rental location board at the vehicle rental lot.

4. The method of claim 3, wherein the second message also contains vehicle identification information.

5. The method of claim 3, wherein the second message also contains instructions for departing the vehicle rental lot.

6. The method of claim 3, wherein the second message also contains promotional offers.

7. The method of claim 3, further comprising:
receiving signals from the one or more beacons after returning to the vehicle rental lot by the mobile communication device;
sending, by the mobile communication device, a third message to the vehicle rental transaction system in response to receipt of at least one of the signals from the one or more beacons, wherein the third message is indicative of the mobile communication device and the customer being at the vehicle rental lot and contains the identifier, and wherein the third message initiates a return phase of the vehicle rental transaction; and
receiving a fourth message in response to the third message containing an indication that the vehicle rental transaction is complete during the return phase of the vehicle rental transaction by the mobile communication device.

8. The method of claim 7, further comprising:
receiving a fifth message from the vehicle rental transaction system requesting completion information by the mobile communication device; and
sending a sixth message to the vehicle rental transaction system containing the completion information by the mobile communication device.

9. The method of claim 8, wherein the completion information comprises vehicle mileage.

10. The method of claim 8, wherein the completion information comprises vehicle fuel level.

11. The method of claim 8, wherein the completion information comprises vehicle parking spot.

12. A method of completing a pre-arranged vehicle rental transaction comprising:
providing a beacon at a pre-determined location in a vehicle rental lot, the beacon emitting a signal including a beacon identifier for the beacon;
processing, by a vehicle transaction system of a vehicle transaction server and mobile communication software executing on a mobile communication device, a reservation for a vehicle with the vehicle rental transaction system, wherein the vehicle rental transaction system records loyalty information for a customer reservation times for the reservation, and the reservation in a transaction record and associates the transaction record with a customer profile associated with the customer, wherein the customer profile comprising payment information that the vehicle transaction system processes for payment of the reservation, preferences for electronic receipts, preferences for messages and alerts to the mobile communication device, pick-up and drop-off preferences including preferences for interacting with the beacon, customer preferences for vehicle features and settings;
facilitating, by the vehicle transaction server and the mobile communication device, a network connection to one another based on receipt of the signal by the mobile communication device and using text-based messaging between the mobile communication device and the vehicle rental transaction server based on receipt of the signal;
receiving, by the vehicle rental transaction system, a first message over the network connection from the mobile communication device of the customer at the vehicle rental lot in response to receipt of the signal from the beacon by the mobile communication software, obtaining, by the vehicle rental transaction system, the transaction record and the customer profile, wherein the first message is indicative of the mobile communication device being at the location and contains the beacon identifier for the beacon and an identifier that distinguishes the customer from other customers at the vehicle rental lot and is associated with the transaction record, and wherein the first message initiates a next phase of a vehicle rental transaction and the first message is sent from the mobile communication software by just detecting the signal being sent from the beacon and responsive thereto sending the first message to the vehicle rental transaction server;

accessing the transaction record of the customer and the customer profile by the vehicle rental transaction system based on the identifier;

associating an available vehicle with the customer as part of the transaction record by the vehicle rental transaction system based on the transaction record and the customer profile and associating a vehicle location for the available vehicle at the vehicle rental lot;

sending a second message in response to the first message as a text message to the mobile communication device and the second message containing vehicle location information, including the vehicle location at the vehicle rental lot, for the customer to proceed directly to the available vehicle during the next phase of the vehicle rental transaction by the vehicle rental transaction system, and completing pickup of the available vehicle based on interaction between the beacon, the mobile communication device, and the vehicle rental transaction system when the mobile communication device is detected as being located at the vehicle rental lot using the text-based messaging; and processing the method without the customer stopping at a vehicle rental office or a vehicle rental location board at the vehicle rental lot.

13. The method of claim 12, wherein the second message also contains vehicle location information.

* * * * *